US 12,093,346 B2

United States Patent
Chen et al.

(10) Patent No.: US 12,093,346 B2
(45) Date of Patent: Sep. 17, 2024

(54) UNSUPERVISED WELL LOG RECONSTRUCTION AND OUTLIER DETECTION

(71) Applicant: Schlumberger Technology Corporation, Sugar Land, TX (US)

(72) Inventors: Xiaoli Chen, Houston, TX (US); Hiren Maniar, Houston, TX (US); Aria Abubakar, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 327 days.

(21) Appl. No.: 17/753,499

(22) PCT Filed: Sep. 3, 2020

(86) PCT No.: PCT/US2020/070494
§ 371 (c)(1),
(2) Date: Mar. 4, 2022

(87) PCT Pub. No.: WO2021/046576
PCT Pub. Date: Mar. 11, 2021

(65) Prior Publication Data
US 2022/0327324 A1    Oct. 13, 2022

Related U.S. Application Data

(60) Provisional application No. 62/897,088, filed on Sep. 6, 2019.

(51) Int. Cl.
*G06F 18/22*    (2023.01)
*G06N 3/088*    (2023.01)

(52) U.S. Cl.
CPC ............. *G06F 18/22* (2023.01); *G06N 3/088* (2013.01)

(58) Field of Classification Search
CPC .......... G06F 18/22; G06N 3/088; G06N 3/02; E21B 47/00; E21B 2200/22; G01V 1/36; G01V 1/40
See application file for complete search history.

(56) References Cited

U.S. PATENT DOCUMENTS

| | | | |
|---|---|---|---|
| 2001/0013026 A1* | 8/2001 | Shaffer | G06F 18/2433 706/12 |
| 2004/0133531 A1 | 7/2004 | Chen et al. | |
| 2016/0086079 A1* | 3/2016 | De Stefano | G06N 3/08 706/12 |

OTHER PUBLICATIONS

Alzate et al., "Generating Synthetic Well Logs by Artificial Neural Networks (ANN) Using MISO-ARMAX Model in Cupiagua Field," SPE-169388-MS, SPE Latin American and Caribbean Petroleum Engineering Conference held in Maracalbo, Venezuela May 21-23, 2014.*

(Continued)

*Primary Examiner* — Manuel L Barbee
(74) *Attorney, Agent, or Firm* — Jeffrey D. Frantz

(57) ABSTRACT

A method includes receiving well log data comprising a plurality of well logs, identifying one or more sections of one or more well logs of the plurality of well logs that have substantially complete data, training a reconstruction neural network to reconstruct incomplete well logs based on the one or more sections of the one or more well logs that have substantially complete data, and reconstructing one or more incomplete well logs of the plurality of well logs using the reconstruction neural network.

20 Claims, 8 Drawing Sheets

(56) References Cited

OTHER PUBLICATIONS

Wong et al., "Permeability Determination Using Neural Networks in the Rawva Field, Offshore India," SPE 38034, first presented at the 1997 SPE Asia Pacific Oil and Gas Conference, Kuala Lumpur, Malaysia, Apr. 14-16, 1997, pp. 99-104.*

Valentine, A. P. et al., "Data Space Reduction, Quality Assessment and Searching of Seismograms: Autoencoder Networks for Waveform Data", Geophysical Journal International, vol. 189, No. 2, May 2012, pp. 1183-1202.*

Akkurt et al., "Acceleration and Enhancing Petrophysical Analysis With Machine Learning: a Case Study of an Automated System for Well Log Outlier Detection and Reconstruction," SPWLA 59th Annual Logging Symposium, Jun. 2-6, 2018, 25 pages.

Alzate et al., "Generating Synthetic Well Logs by Artificial Neural Networks (ANN) Using MISO-ARMAX Model in Cupiagua Field," SPE-169388-MS, SPE Latin American and Caribbean Petroleum Engineering Conference held in Maracaibo, Venezuela May 21-23, 2014, 14 pages.

Bhowmick et al., "Deep Autoassociative Neural Networks for Noise Reduction in Seismic data," arXiv, May 1, 2018, <URL: https://arxiv.org/abs/1805.00291>, 6 pages.

Mohaghegh et al., "Reducing the Cost of Field-Scale Log Analysis Using Virtual Intelligence Techniques," SPE 57454, 1999 SPE Eastern Regional Meeting held in Charleston, WV Oct. 21-22, 1999, 15 pages.

Wong et al., "Permeability Determination Using Neural Networks in the Ravva Field, Offshore India," SPE 38034, first presented at the 1997 SPE Asia Pacific Oil and Gas Conference, Kuala Lumpur, Malaysia, Apr. 14-16, pp. 99-104.

Du, Y. et al., "An Effective Hash-based Method for Generating Synthetic Well Log", International Conference on Advanced Language Processing and Web Information Technology, Jul. 2008.

Zhang, D., "Synthetic Well Logs Generation via Recurrent Neural Networks",Petroleum Exploration and Development, vol. 45, No. 4, Aug. 2018.

Search Report and Written Opinion of International Patent Application No. PCT/US2020/070494 mailed Nov. 5, 2020.

International Preliminary Report on Patentability of International Patent Application No. PCT/US2020/070494 mailed on Mar. 17, 2022; 8 pages.

* cited by examiner

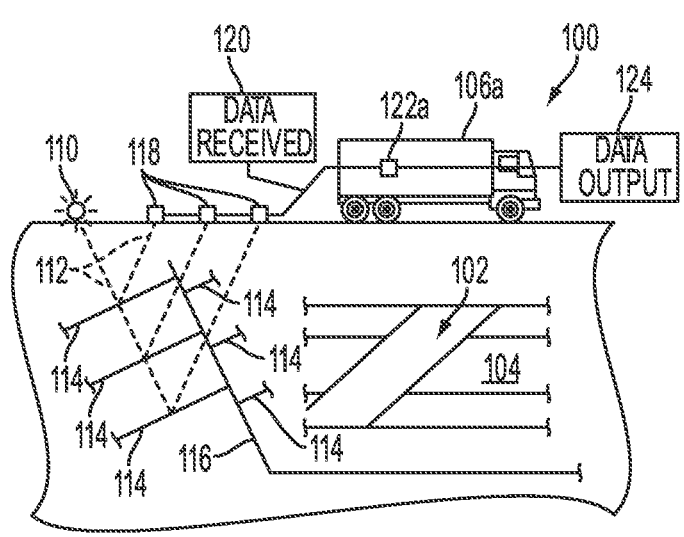
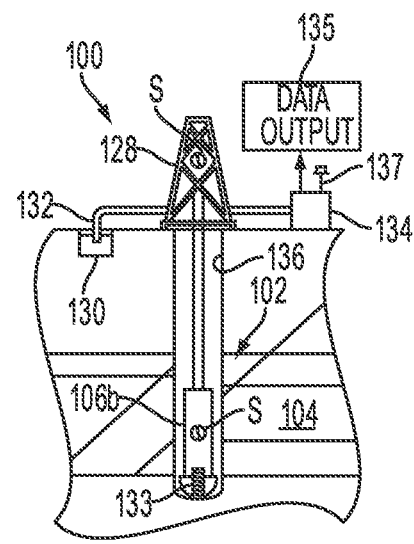
FIG. 1A
FIG. 1B
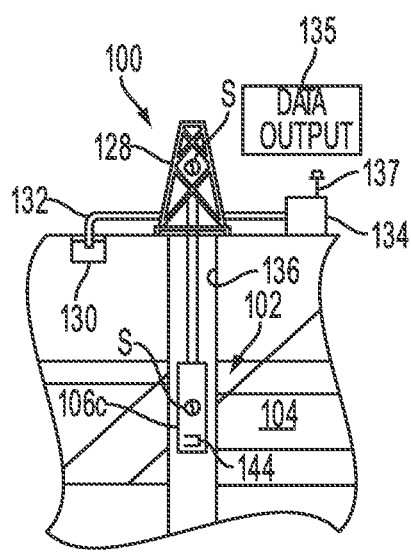
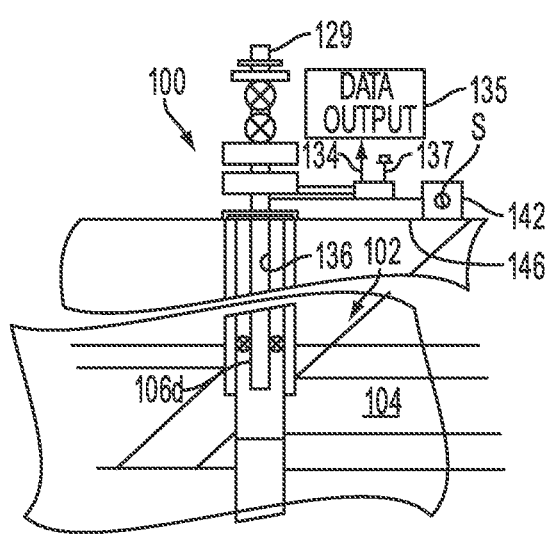
FIG. 1C
FIG. 1D

UNSUPERVISED WELL LOG RECONSTRUCTION AND OUTLIER DETECTION

CROSS-REFERENCE TO RELATED APPLICATIONS

This application is a National Stage Entry of International Application No. PCT/US2020/070494, filed Sep. 3, 2020, which claims priority to U.S. Provisional Patent Application Ser. No. 62/897,088, filed on Sep. 6, 2019. U.S. Provisional Patent Application Ser. No. 62/897,088 is incorporated herein by reference in its entirety.

BACKGROUND

In the oil and gas industry, well logs are collected using logging equipment, either during or after drilling, to determine characteristics of the formation around the well. Well logs can include gamma ray logs, resistivity logs, neutron logs, density logs, porosity logs, and others.

However, well logs may be incomplete, e.g., due to sensor failure and/or human error. Recently, machine learning models have been used to automatically reconstruct the missing elements of the well logs. Generally, the machine learning models are trained using a corpus of labeled high-quality well logs from a specific area, which the machine learning models use to establish predictive links between input, incomplete well logs and output or "reconstructed" well logs, in which the incomplete data is filled in.

However, acquisition of such labeled high-quality well log training data can present challenges. For example, the section for high-quality well logs are determined manually by a human operator, generally a domain expert, which can be expensive and time-consuming. Further, due to difference in underground geochemical properties, the labeled high-quality well log may not be of general applicability, that is, labels for well logs from one field may not be useful to train machine learning models for reconstructing well logs for another field. Thus, in relatively new fields, there may not be any or may not be a sufficient amount of labeled training data available.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Figure 2:
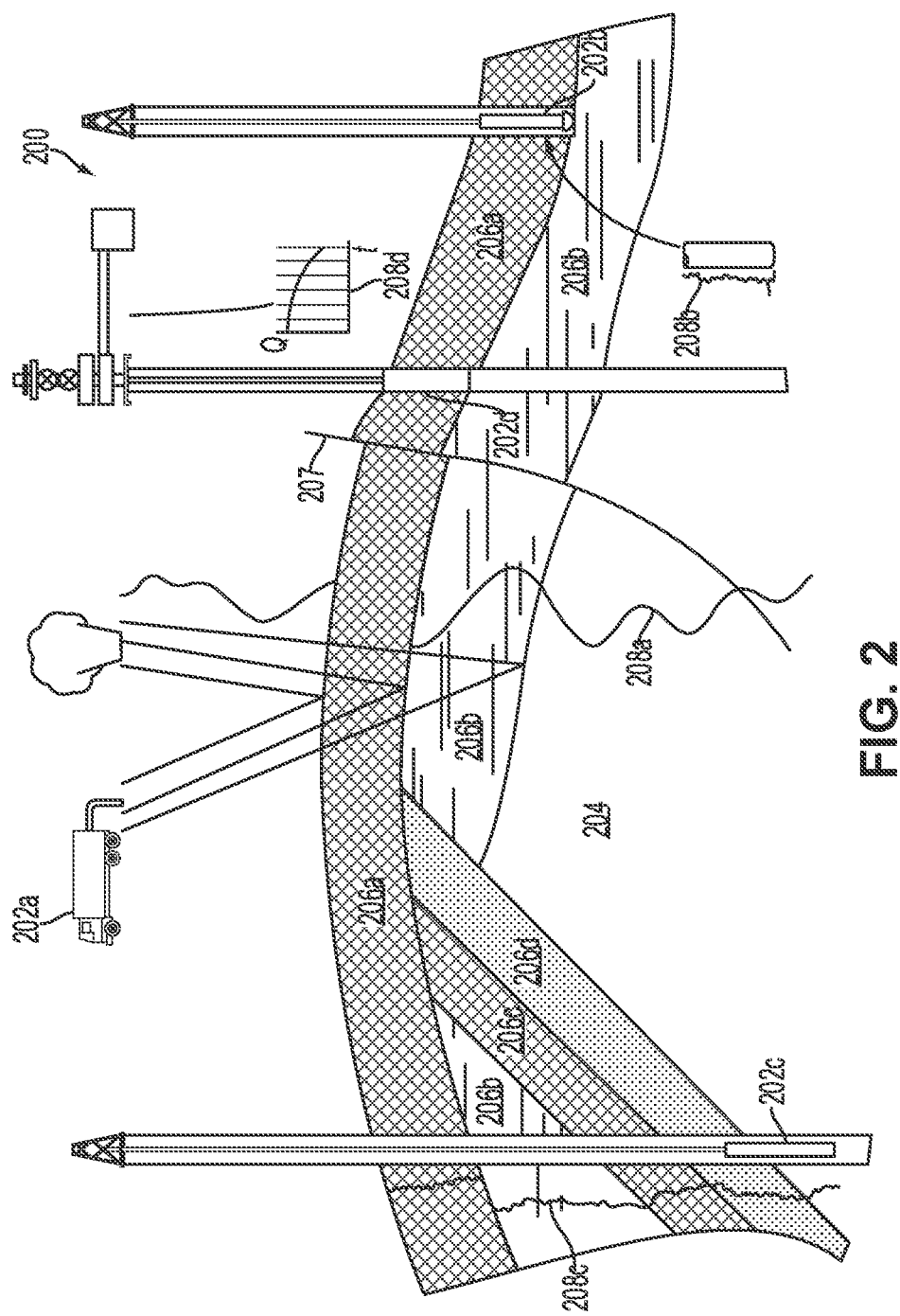

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106*b* suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106*b* may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106*c* suspended by rig 128 and into wellbore 136 of FIG. 1B. Wireline tool 106*c* is adapted for deployment into wellbore 136 for generating well logs, performing downhole tests and/or collecting samples. Wireline tool 106*c* may be used to provide another method and apparatus for performing a seismic survey operation. Wireline tool 106*c* may, for example, have an explosive, radioactive, electrical, or acoustic energy source 144 that sends and/or receives electrical signals to surrounding subterranean formations 102 and fluids therein.

Wireline tool 106*c* may be operatively connected to, for example, geophone receivers-118 and a computer 122*a* of a seismic truck 106*a* of FIG. 1A. Wireline tool 106*c* may also provide data to surface unit 134. Surface unit 134 may collect data generated during the wireline operation and may produce data output 135 that may be stored or transmitted. Wireline tool 106*c* may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106*c* to measure downhole parameters which relate to, for example porosity, permeability, fluid composition and/or other parameters of the field operation.

FIG. 1D illustrates a production operation being performed by production tool 106*d* deployed from a production unit or Christmas tree 129 and into completed wellbore 136 for drawing fluid from the downhole reservoirs into surface facilities 142. The fluid flows from reservoir 104 through perforations in the casing (not shown) and into production tool 106*d* in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a-202d positioned at various locations along oilfield 200 for collecting data of subterranean structure 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the structure 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log (e.g., static plot 208c) are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
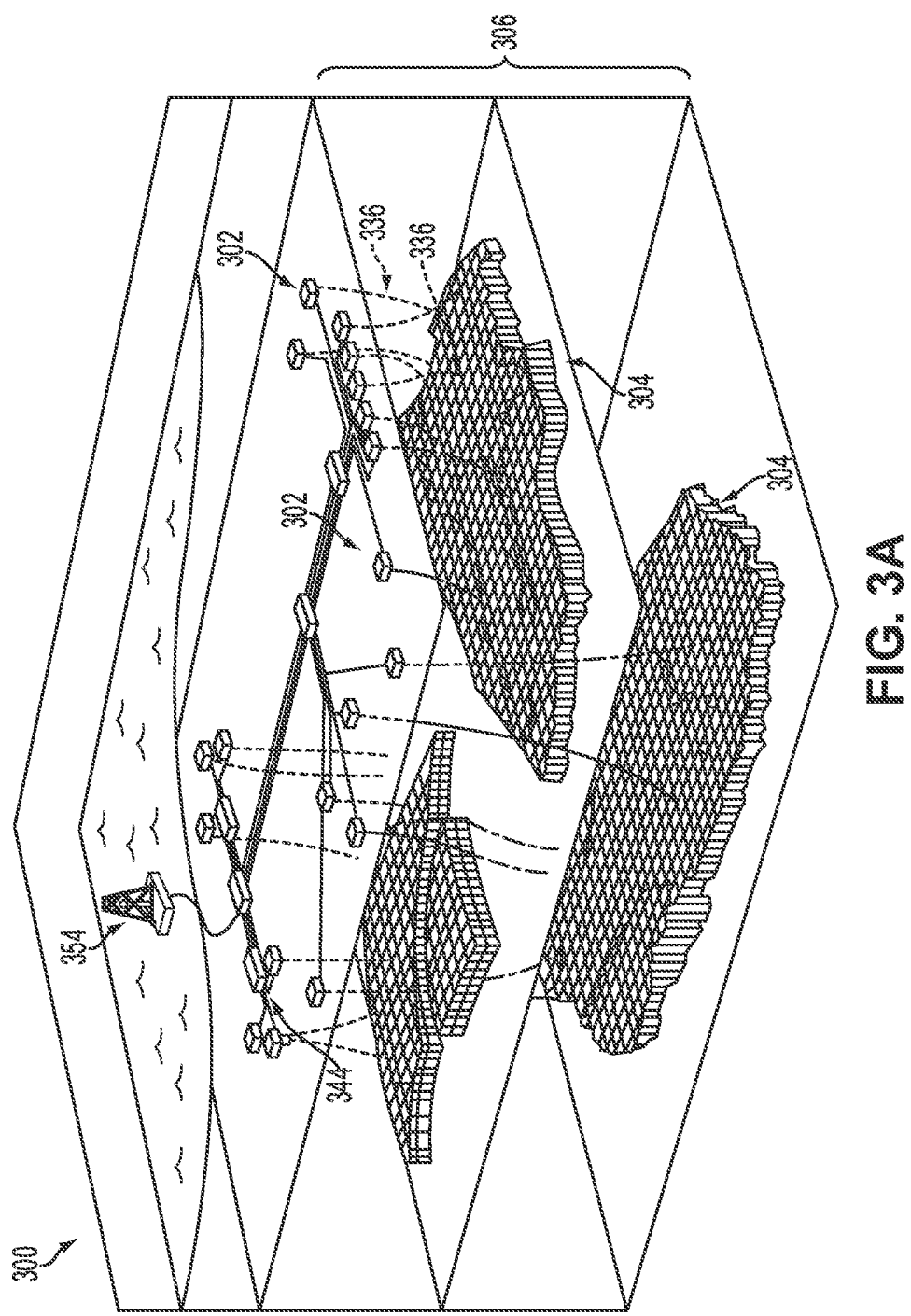

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
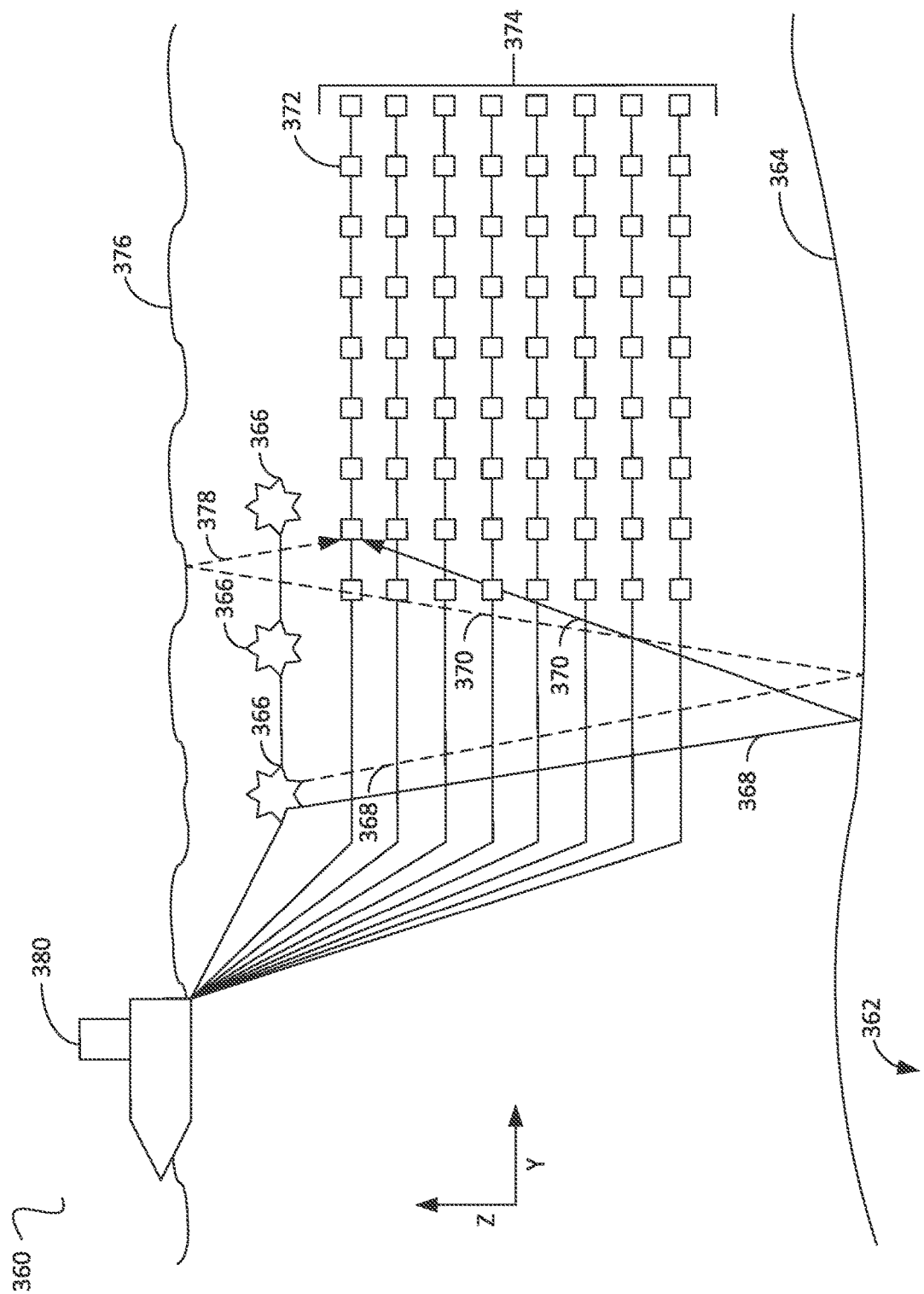

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of the reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362. Marine seismic acquisition systems tow each streamer in streamer array 374 at the same depth (e.g., 5-10 m). However, marine-based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Embodiments of the disclosure may provide systems and methods for automating well log quality control analysis and log reconstruction processes, contributing to the competency and efficiency in management of high-quality field data. In some embodiments, the systems and methods may employ a workflow that takes advantage of well logs being correlated and exploits this correlation via one or more neural networks, e.g., autoencoders. The autoencoder(s) may be particularly useful in data denoising and reconstruction.

Figure 4:
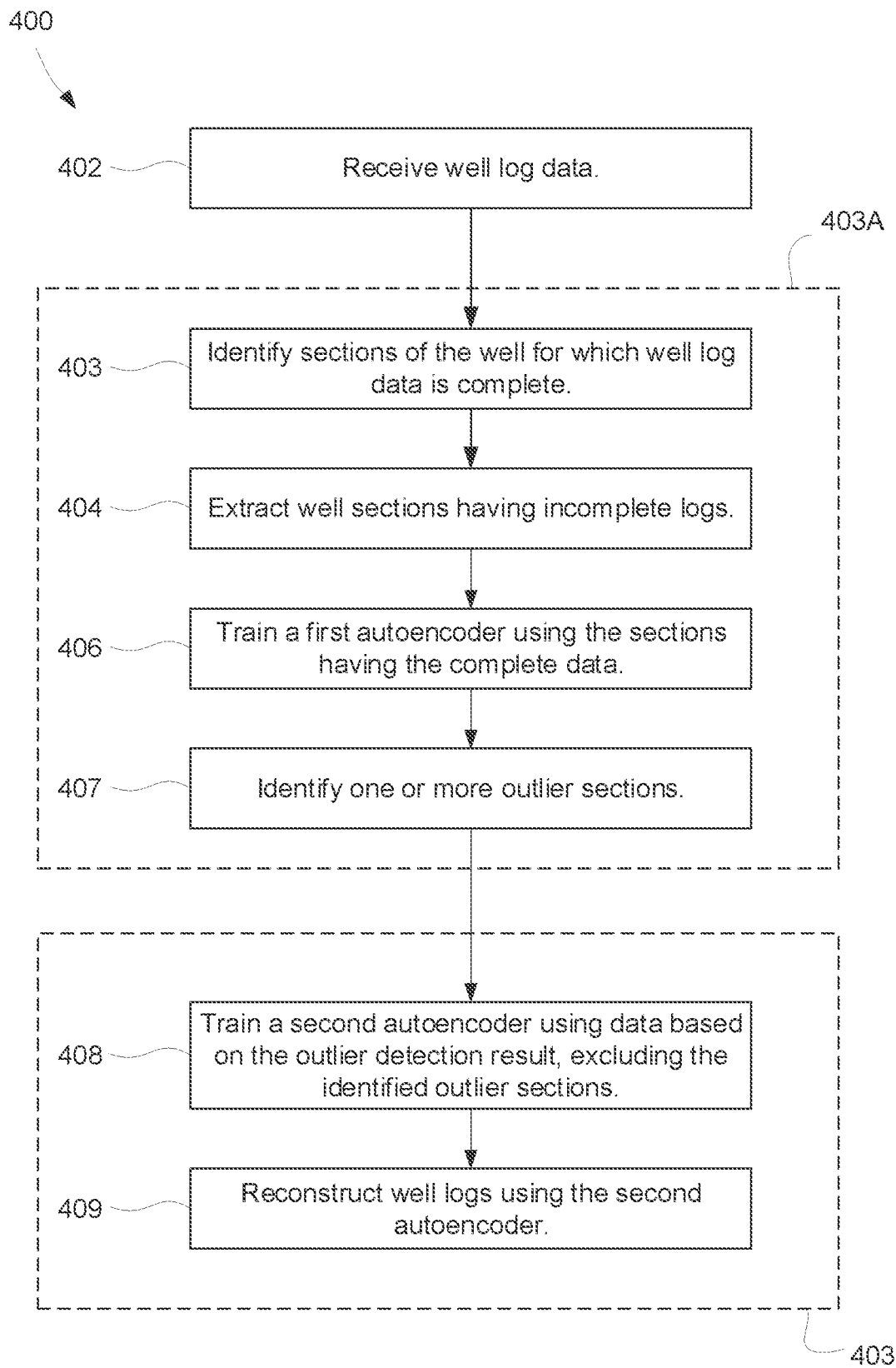
FIG. 4 illustrates a flowchart of a workflow for well log reconstruction, e.g., using a neural network such as an auto-encoder, according to an embodiment.

The workflow 400, illustrated in FIG. 4, may begin by acquiring well log data which may include a plurality of well logs, as at 402. The well logs may be apriori unlabeled, or may be partially labeled, or entirely labeled. In this context, "labeled" means that a human user has reviewed the well log and indicated incomplete or erroneous sections of the data, which may provide the basis for supervised learning, as a machine learning model may make predictions based on the human user's conclusions. Because the workflow 400 may not rely on supervised learning, however, the workflow 400 may operate whether or not the well logs are labeled. This may avoid time-consuming and potentially non-repeatable (e.g., subjective, prone to error and mislabeling) human-user interaction with the raw well log data. The workflow 400 may proceed through two general stages: an outlier detection stage 403A and log reconstruction stage 403B.

In the outlier detection stage 403A, the sections of the well for which the well log data is substantially complete are identified, as at 403. By way of example, a measurement may be conducted between depths of 1000 feet and 1500 feet. Between depth 1100 feet and 1105 feet, the density log is filled with −999, or otherwise indicates that values are missing. These may be incomplete sections; in contrast, those sections not filled with −999 may be identified as complete. A variety of other ways to identify missing well logs or segments thereof may also be used.

"Complete" sections may thus be those sections with zero missing logs. "Substantially complete" sections are those with few missing sections, such that the data is sufficient to employ these sections in further analyses. In some embodiments, the workflow 400 may identify those sections that are entirely complete (no missing logs) or those that have, for example, fewer than a threshold number of missing entries. For example, well log data may include a combination of logs (e.g., two or more types of logs selected from the group of density, neutron, gamma, resistivity, and acoustic Δt (sonic)). A larger number of different types of logs for a same depth interval generally corresponds to greater accuracy, although some types of logs are considered more descriptive than others (e.g., a density log). Accordingly, if one or more two types of logs are missing for a depth interval, but the density log is present, the section may still be considered substantially complete, as results may still be achieved using the input. At some number of missing logs (e.g., three), however, the missing logs may be considered incomplete, even if the density log is present.

These identified well sections with substantially complete (or entirely complete) data may be extracted, as at 404 and used to train an outlier detection neural network, e.g., a first or "outlier detection" autoencoder, as at 406. Once trained, the outlier detection autoencoder may be configured to detect outliers in the remaining (substantially) complete well log data. In general, outliers are defined as sections of a well log that deviate from neighboring sections to a degree that would generally indicate a spurious or erroneous signal or data point. As will be described below, this determination may be made statistically. Outliers are removed from the data that may be used to train a second autoencoder (as described below). Removing the outliers may serve to increase the accuracy of the second autoencoder by avoiding training using anomalous or otherwise unrepresentative training data. The result of the outlier detection stage thus is "estimated" well logs that exclude incomplete well log sections and outlier well log sections.

Figure 5:
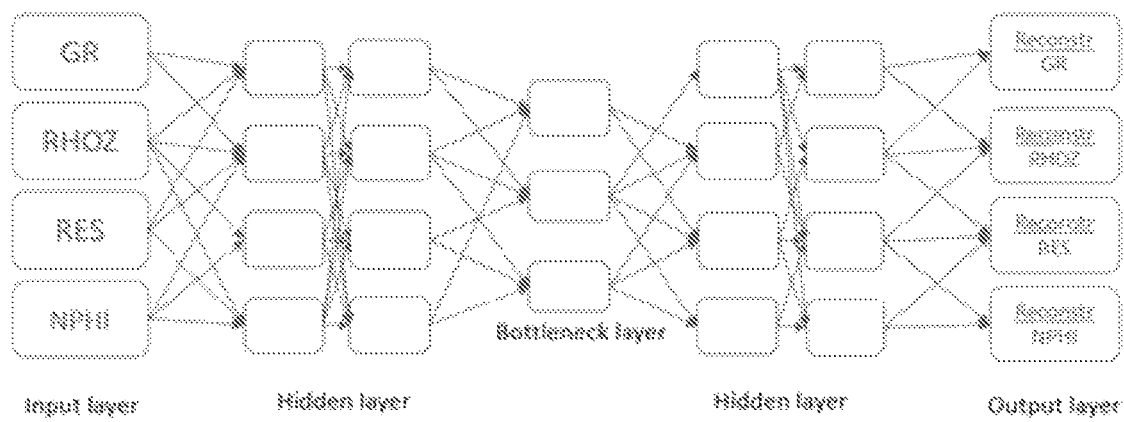
FIG. 5 illustrates a schematic view of a neural network, e.g., for use executing the workflow of FIG. 4, according to an embodiment.

FIG. 5 illustrates an example of a neural network/autoencoder, and reference thereto may assist in a more complete understanding of the outlier detection stage 403A and the log reconstruction stage 403B. The neural network may have an input layer, which may receive well logs (e.g., gamma ray, neutron, resistivity, etc.). A trained neural network may then apply one or more series of layers, with weights in the connections that have been updated through back-propagation to minimize predictive error. The result may be an output layer, which may provide the estimation of well log data.

Accordingly, an autoencoder may be trained to learn the internal correlation between input logs. Thus, a cost function for the autoencoder may be set, which measures the difference between the estimated logs and the original logs. A back-propagation process is then used to minimize the cost function during the training process. Back-propagation may include calculating a gradient of the cost function and updating the weights of the autoencoder in the direction to reduce the cost function. After several hundred epochs of training, the cost function may reach a stable state and may not further decrease.

In some embodiments, there may be a risk that the autoencoder is simply mapping the input to the output layer, and the internal correlation is not learned. To avoid this situation, the bottleneck layer may be narrower that the input layer. By squeezing the bottleneck, the autoencoder breaks the identical mapping relation and is forced to learn the internal correlation. With back-propagation and a narrower bottleneck layer, the autoencoder is trained to learn the correlation between well logs.

Returning to FIG. 4, the workflow 400 may proceed to the log reconstruction stage 403B. This stage 403B may be conducted by a second autoencoder, also referred to herein as a "log reconstruction" or "reconstruction" autoencoder. The second autoencoder may be trained, as at 408, using the result of the outlier detection stage 403A, namely, the estimated well logs, e.g., the input well logs from which the incomplete sections and outlier section shave been extracted. Next, the incomplete well logs received at 402 (and extracted from consideration during the initial, outlier-detection stage 403A) may be introduced into the trained second autoencoder and reconstructed. For example, individual logs may be treated as including missing data and may be reconstructed by the second autoencoder.

The autoencoder-based log reconstruction workflow is thus an unsupervised modeling workflow, which may avoid the drawbacks inherent to supervised modeling discussed above. That is, for example, the workflow may not use labeled data when reconstructing the log. This workflow can be applied to a wide range of log dataset and improving the efficiency in log quality control analysis and log reconstruction.

Figure 6:
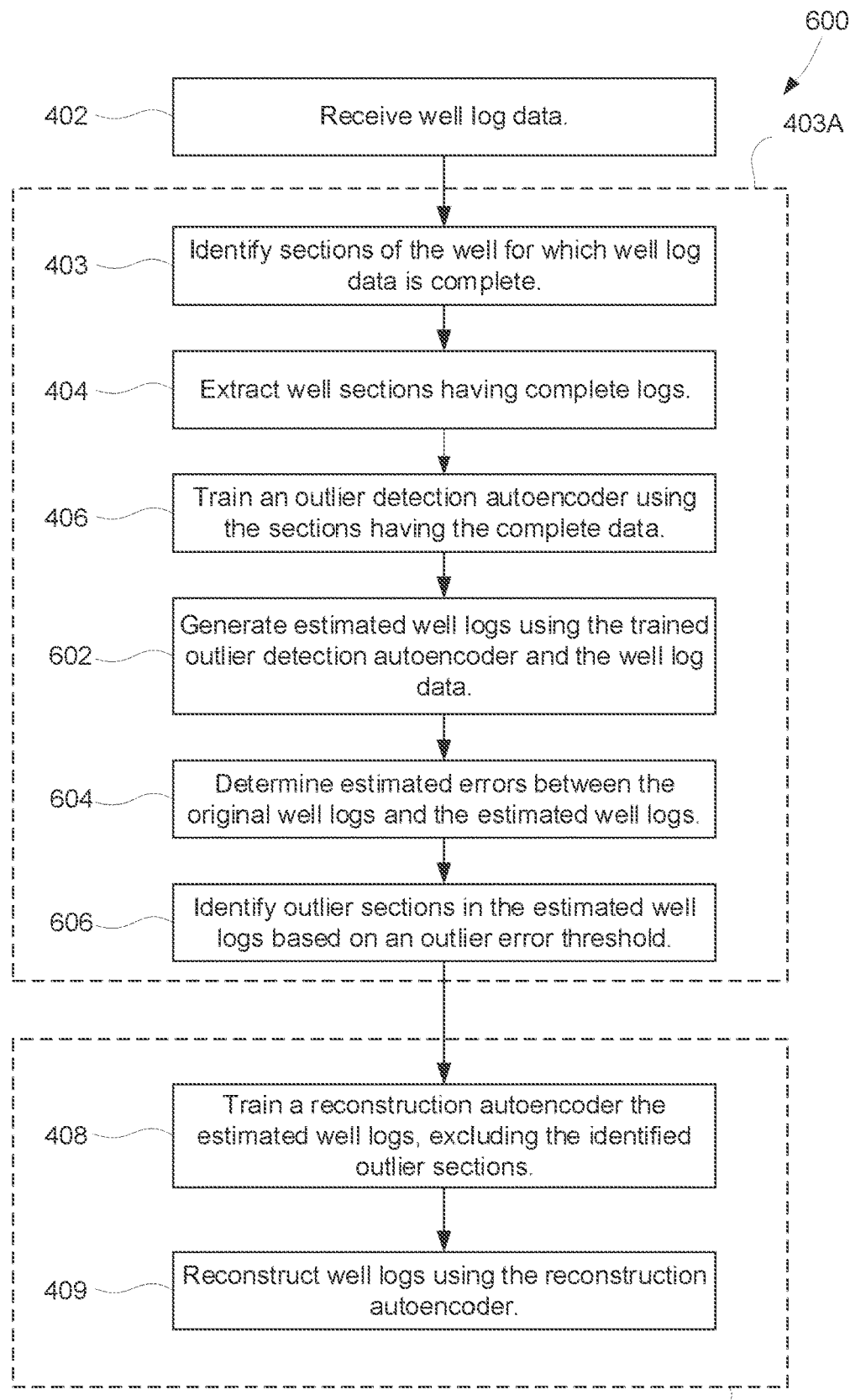
FIG. 6 illustrates a flowchart of a workflow for well log reconstruction and outlier detection, e.g., using a neural network such as an autoencoder, according to an embodiment.

FIG. 6 illustrates a flowchart of another workflow 600 for well log reconstruction, according to an embodiment. The workflow 600 may be a more detailed version of an embodiment of the workflow 400 and thus the two workflows 400, 600 should not be considered mutually exclusive.

The workflow 600 may include the worksteps 402, 403, 404, and 406, as shown in FIG. 4, e.g., provided as part of the outlier detection stage 403A. In addition, the outlier stage 403A may include generating estimated well logs using the trained outlier detection autoencoder and the well log data, as at 602. The estimated well logs may be produced based on the original well log data, e.g., by the outlier detection autoencoder attempting to complete or replace the extracted incomplete sections.

Figure 7:
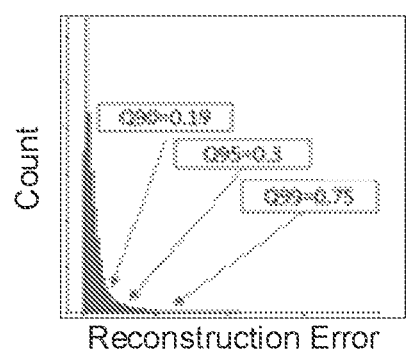
FIG. 7 illustrates a reconstruction error histogram, according to an embodiment.

The workflow 600 may then include determining estimated errors between the original well logs and the estimated well logs, as at 604, e.g., by comparing the estimated data to the original data. The estimated errors may be stored as a histogram, as shown in FIG. 7, for example. From the estimated errors, an outlier error threshold may be determined. In some embodiments, the outlier error threshold may be determined as the largest value between a hard-cutoff (e.g., static and/or predetermined) and soft (e.g., dynamic) percentile value. In some embodiments, the hard-cutoff value is a heuristic value from experience. The soft percentile value is determined by the error distribution in the well log training data. For example, soft percentile value may be the value corresponding to 90th, 95th, or 98th percentile of the estimated error distribution. The workflow 600 may then use the outlier error threshold to identify outlier sections, as at 606, which are those sections that differ from the original by greater than a threshold amount.

In some embodiments, an uncertainty analysis may be conducted on the results of the outlier detection stage 403A, e.g., the well logs excluding the incomplete sections and the identified outliers. For example, a Monte Carlo dropout method may be implemented for the uncertainty analysis. During Monte Carlo dropout, a random number of neural nodes may be deactivated, and then one model output sample may be generated. After repeating the Monte Carlo dropout multiple times, a series of output samples are generated. The confidence interval of the results can be calculated as $[\mu-2*\sigma, \mu+2*\sigma]$, where $\mu$ is the mean, and $\sigma$ is the standard deviation.

The workflow 600 may then proceed to the implementation/reconstruction stage 403B. As with the similar stage 403B of FIG. 4, this stage 403B of FIG. 6 may include training the second, reconstruction autoencoder to reconstruct well logs based on the results of the outlier detection stage 403A (e.g., the well logs with incomplete and outlier sections removed), as at 408. Thereafter, second autoencoder may reconstruct the well logs, as at 409. In at least some embodiments, to "reconstruct" a well log means to predict the information that would have been included in the incomplete section of the well log, if the well log were not incomplete, and then add the predicted portions into the well log. In some embodiments, an uncertainty analysis may be conducted on the results of the reconstruction stage 403B, in either of workflows 400 and/or 600, i.e., the reconstructed well logs. Such uncertainty analysis may be performed using a Monte Carlo dropout technique, as discussed above.

Accordingly, embodiments of the present disclosure may provide an integrated, autoencoder-based, log data outlier detection workflow, which may facilitate an unsupervised training and implementation of a reconstruction autoencoder (or any other type of neural network). As such, the present embodiment may provide data outlier detection and log reconstruction, e.g., at the same time. This workflow can be applied to a wide range of log datasets and may improve the efficiency in log quality control and log reconstruction. As a result, well logs that are reconstructed may be displayed or otherwise communicated (visualized) to a user. Well logs have many practical applications in many different petro-technical workflows, such as, among others, determining location, techniques, and otherwise informing hydrocarbon extraction processes such as exploration, drilling, treatment, intervention, production, etc. Accordingly, the present disclosure provides a more accurate, reconstruction of well logs which can ameliorate the effects of gaps in the well log data. Moreover, this amelioration workflow may be orders of magnitude faster than previous attempts, even with the same processing power, taking processing times down from days to minutes.

Figure 8:
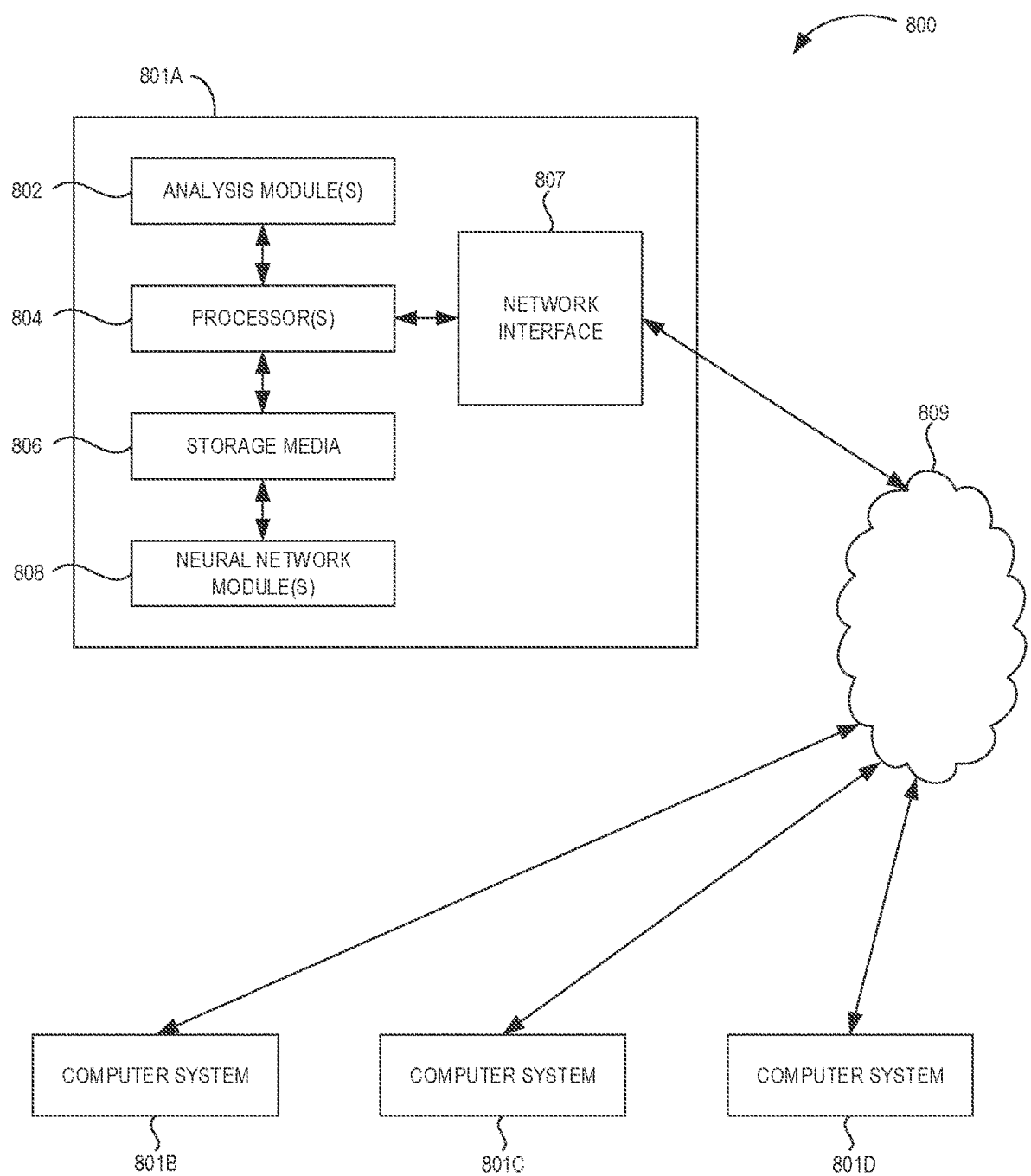
FIG. 8 illustrates a schematic view of a computing system for performing one or more of the methods disclosed herein, according to an embodiment.

In some embodiments, any of the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis module(s) 802 configured to perform various tasks according to some embodiments, such as one or more methods disclosed herein. To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor can include a microprocessor, microcontroller, processor module or subsystem, programmable integrated circuit, programmable gate array, or another control or computing device.

The storage media 806 can be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 800 contains one or more neural network module(s) 808. In the example of computing system 800, computer system 801A includes the neural network module 808. In some embodiments, a neural network module may be used to perform some or all aspects of one or more embodiments of the methods. In alternate embodiments, a plurality of neural network modules may be used to perform some or all aspects of methods.

It should be appreciated that computing system 800 is only one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method comprising:
   receiving well log data comprising a plurality of well logs;
   identifying a plurality of sections of one or more well logs of the plurality of well logs that have substantially complete data;
   with a first section of the plurality of sections, training an outlier detection neural network to identify outliers in a remaining portion of the plurality of sections;

applying the outlier detection neural network to the remaining portion of the plurality of sections to identify an outlier section;

removing the outlier section from the remaining portion of the plurality of sections resulting in a training portion of the plurality of sections;

using the training portion, training a reconstruction neural network to reconstruct incomplete well logs based on the plurality of sections of the one or more well logs that have substantially complete data; and reconstructing one or more incomplete well logs of the plurality of well logs using the reconstruction neural network.

2. The method of claim 1, further comprising extracting one or more incomplete sections of the one or more incomplete well logs of the plurality of well logs, prior to training the reconstruction neural network, such that the reconstruction neural network is not trained using the one or more incomplete sections.

3. The method of claim 2, wherein training the outlier detection neural network includes:

generating one or more estimated well logs using the outlier detection neural network by estimating the one or more incomplete sections using the outlier detection neural network; and identifying the outlier section at least partially by comparing the one or more estimated well logs with corresponding logs of the plurality of well logs.

4. The method of claim 3, wherein identifying the outlier section comprises determining an error threshold based on a comparison of the one or more estimated well logs with the corresponding logs, wherein the error threshold comprises a hard cut-off, a soft cut-off, or a combination thereof, and wherein the outlier section is identified based on having a deviation from the corresponding log that exceeds the error threshold.

5. The method of claim 3, further comprising performing a Monte Carlo uncertainty analysis on the outlier detection neural network, the reconstruction neural network, or both.

6. The method of claim 1, wherein the reconstruction neural network is not trained using the outlier section.

7. The method of claim 1, wherein the training of the reconstruction neural network is unsupervised.

8. The method of claim 1, wherein the reconstruction neural network comprises an autoencoder.

9. A non-transitory computer-readable medium storing instructions that, when executed by at least one processor of a computing system, cause the computing system to perform operations, the operations comprising:

receiving well log data comprising a plurality of well logs;

identifying a plurality of sections of one or more well logs of the plurality of well logs that have substantially complete data;

with a first section of the plurality of sections, training an outlier detection neural network to identify outliers in a remaining portion of the plurality of sections;

applying the outlier detection neural network to the remaining portion of the plurality of sections to identify an outlier section;

removing the outlier section from the remaining portion of the plurality of sections resulting in a training portion of the plurality of sections;

using the training portion, training a reconstruction neural network to reconstruct incomplete well logs based on the plurality of sections of the one or more well logs that have substantially complete data; and reconstructing one or more incomplete well logs of the plurality of well logs using the reconstruction neural network.

10. The medium of claim 9, wherein the operations further comprise extracting one or more incomplete sections of the one or more incomplete well logs of the plurality of well logs, prior to training the reconstruction neural network, such that the reconstruction neural network is not trained using the one or more incomplete sections.

11. The medium of claim 10, wherein training the outlier detection neural network includes:

generating one or more estimated well logs using the outlier detection neural network by estimating the one or more incomplete sections using the outlier detection neural network; and identifying the outlier section at least partially by comparing the one or more estimated well logs with corresponding logs of the plurality of well logs.

12. The medium of claim 11, wherein identifying the outlier section comprises determining an error threshold based on a comparison of the one or more estimated well logs with the corresponding logs, wherein the error threshold comprises a hard cut-off, a soft cut-off, or a combination thereof, and wherein the outlier section is identified based on having a deviation from the corresponding log that exceeds the error threshold.

13. The medium of claim 11, wherein the operations further comprise performing a Monte Carlo uncertainty analysis on the outlier detection neural network, the reconstruction neural network, or both.

14. The medium of claim 9, wherein the reconstruction neural network is not trained using the outlier section.

15. The medium of claim 9, wherein the training of the reconstruction neural network is unsupervised, and wherein the reconstruction neural network comprises an autoencoder.

16. A computing system, comprising:

one or more processors; and a memory system including one or more non-transitory computer-readable media storing instructions that, when executed by at least one of the one or more processors, cause the computing system to perform operations, the operations comprising:

receiving well log data comprising a plurality of well logs;

identifying a plurality of sections of one or more well logs of the plurality of well logs that have substantially complete data;

with a first section of the plurality of sections, training an outlier detection neural network to identify outliers in a remaining portion of the plurality of sections;

applying the outlier detection neural network to the remaining portion of the plurality of sections to identify an outlier section;

removing the outlier section from the remaining portion of the plurality of sections resulting in a training portion of the plurality of sections;

using the training portion, training a reconstruction neural network to reconstruct incomplete well logs based on the plurality of sections of the one or more well logs that have substantially complete data; and reconstructing one or more incomplete well logs of the plurality of well logs using the reconstruction neural network.

17. The computing system of claim 16, wherein the operations further comprise extracting one or more incomplete sections of the one or more incomplete well logs of the plurality of well logs, prior to training the reconstruction neural network, such that the reconstruction neural network is not trained using the one or more incomplete sections.

18. The computing system of claim 17, wherein training the outlier detection neural network includes:
    generating one or more estimated well logs using the outlier detection neural network by estimating the one or more incomplete sections using the outlier detection neural network; and
    identifying the outlier section at least partially by comparing the one or more estimated well logs with corresponding logs of the plurality of well logs.

19. The computing system of claim 18, wherein identifying the outlier section comprises determining an error threshold based on a comparison of the one or more estimated well logs with the corresponding logs, wherein the error threshold comprises a hard cut-off, a soft cut-off, or a combination thereof, and wherein the outlier section is identified based on having a deviation from the corresponding log that exceeds the error threshold.

20. The computing system of claim 16,
    wherein the reconstruction neural network is not trained using the outlier section.

\* \* \* \* \*